United States Patent [19]

Kashiwa et al.

[11] Patent Number: 5,583,188

[45] Date of Patent: Dec. 10, 1996

[54] PROCESS FOR PRODUCING AN OLEFIN POLYMER OR COPOLYMER AND CATALYST COMPOSITION THEREFOR

[75] Inventors: Norio Kashiwa, Iwakuni; Mamoru Kioka; Yoshihisa Ushida, both of Ohtake, all of Japan

[73] Assignee: Mitsui Petrochemical Industries, Ltd., Tokyo, Japan

[21] Appl. No.: 229,104

[22] Filed: Apr. 18, 1994

Related U.S. Application Data

[63] Continuation of Ser. No. 4,657, Jan. 14, 1993, abandoned, which is a continuation of Ser. No. 892,719, May 29, 1992, abandoned, which is a continuation of Ser. No. 463,885, Jan. 10, 1990, abandoned, which is a continuation of Ser. No. 256,140, Oct. 7, 1988, abandoned, which is a continuation of Ser. No. 827,181, Feb. 6, 1986, abandoned, which is a continuation of Ser. No. 717,609, Apr. 1, 1985, abandoned, which is a continuation of Ser. No. 465,583, Feb. 10, 1983, abandoned.

[30] Foreign Application Priority Data

Feb. 21, 1982 [JP] Japan ................... 57-19679

[51] Int. Cl.$^6$ .................. C08F 4/651; C08F 4/654; C08F 10/00
[52] U.S. Cl. .................. 526/125.6; 502/123; 502/127; 526/351
[58] Field of Search ................... 526/125, 125.6

[56] References Cited

U.S. PATENT DOCUMENTS

| | | | |
|---|---|---|---|
| 4,069,169 | 1/1978 | Toyoda et al. | 526/125 |
| 4,107,414 | 8/1978 | Giannini et al. | 526/125 |
| 4,243,552 | 1/1981 | Welch | 526/125 |
| 4,256,866 | 3/1981 | Karagannis et al. | 526/141 |
| 4,310,439 | 1/1982 | Langer | 526/125 |
| 4,329,253 | 5/1982 | Goodall et al. | 526/142 |

FOREIGN PATENT DOCUMENTS

| | | |
|---|---|---|
| 45976 | 2/1982 | European Pat. Off. . |
| 45977 | 2/1982 | European Pat. Off. . |

*Primary Examiner*—Edward J. Smith
*Attorney, Agent, or Firm*—Sherman and Shalloway

[57] ABSTRACT

As improved process for producing an olefin polymer or copolymer by using a novel catalyst composition composed of (A) a titanium catalyst component containing magnesium, titanium, halogen and an ester specified in claim 1, as an electron donor, (B) an organoaluminum compound and (C) a heterocyclic compound or a ketone specified in claim 1, as a third component. The combination parameter of the ester in (A) and the (C) component is new, and the process can give a highly stereospecific olefin polymer or copolymer in high yields.

7 Claims, No Drawings

PROCESS FOR PRODUCING AN OLEFIN POLYMER OR COPOLYMER AND CATALYST COMPOSITION THEREFOR

This application is a continuation of application Ser. No. 08/004,657, filed Jan. 14, 1993; now abandoned which is a continuation of application Ser. No. 07/892,719, filed May 29, 1992, now abandoned; which is a continuation of application Ser. No. 07/463,885, filed Jan. 10, 1990, now abandoned; which is a continuation of application Ser. No. 07/256,140 filed Oct. 7, 1988; now abandoned which is a continuation of application Ser. No. 06/827,181, filed Feb. 6, 1986 (now abandoned); which is a continuation of application Ser. No. 06/717,609, filed Apr. 1, 1985, now abandoned; which is a continuation of application Ser. No. 06/465,583 filed Feb. 10, 1983, now abandoned.

This invention relates to a process for producing an olefin polymer (sometimes denoting an olefin copolymer as well) by the polymerization (sometimes denoting copolymerization as well) of olefins, and a catalyst composition used therefor. Particularly, it relates to a process for producing olefin polymers which when applied to the polymerization of α-olefins having at least 3 carbon atoms, can give highly stereospecific polymers in high yields.

More specifically, this invention relates to a process for producing an olefin polymer or copolymer which comprises polymerizing or copolymerizing olefins or copolymerizing an olefin with up to 5 mole % of a diolefin in the presence of a catalyst comprising a titanium catalyst component containing magnesium, titanium, halogen and an electron donor, an organoaluminum catalyst component and a third catalyst component, characterized in that said catalyst is composed of (A) a titanium catalyst component containing magnesium, titanium, halogen and an electron donor as essential ingredients, said electron donor being selected from the group consisting of (a) mono- and polyesters of saturated polycarboxylic acids in which at least one of the esteric carbonyl groups is linked to a tertiary or quaternary carbon atom or to a linear or branched chain with at least 4 carbon atoms;

(b) mono- and polyesters of unsaturated polycarboxylic acids in which at least two carboxyl groups are linked to vicinal, double bond forming carbon atoms and in which at least one of the hydrocarbyl radicals R of the COOR groups is a saturated or unsaturated branched radical with 3 to 20 carbon atoms, or is an aryl or arylalkyl radical with 6 to 20 carbon atoms;

(c) mono- and diesters of aromatic dicarboxylic acids with the COOH groups in the ortho-position, in which at least one of the hydrocarbyl radicals R contains from 2 to 20 carbon atoms;

(d) mono- and polyesters of aromatic hydroxy compounds containing at least two hydroxyl groups in the ortho-position, or esters of hydroxyacids containing at least one hydroxyl group in the ortho-position with respect to the carboxyl group;

(e) esters of saturated or unsaturated carboxylic acids RCOOR', in which at least one of the hydrocarbyl radicals R and R' is a saturated or unsaturated branched radical with 3 to 20 carbon atoms, or is an arylalkyl radical with 7 to 20 carbon atoms, or is an acyl radical with 3 to 20 carbon atoms linked to the esteric carbonyl group directly or through a methylene group, and in which the R' radical, when linear, is a hydrocarbyl radical containing from 1 to 20 carbon atoms; and (f) esters of carbonic acid of the formula:

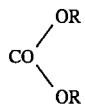

wherein at least one of the hydrocarbyl radicals R, which can be same or different, is a radical having 3 to 20 carbon atoms, (B) an organoaluminum compound, and (C) a third component selected from the group consisting of (i) heterocyclic compounds represented by the following formula

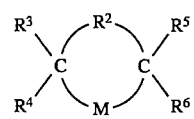

(i)

wherein $R^2$ represents an alkylene group having 2 or 3 carbon atoms or a $C_2$-$C_3$ alkylene group substituted by a substituent selected from alkyl, acyloxy and alkoxy groups; each of $R^3$, $R^4$, $R^5$ and $R^6$ represents a hydrogen atom or an alkyl group having 1 to 12 carbon atoms, at least one of $R^3$ and $R^4$ and at least one of $R^5$ and $R^6$ are said alkyl groups, $R^3$ and $R^4$ together, or $R^5$ and $R^6$ together, may form a cycloalkyl group having 5 or 6 carbon atoms when taken together with the carbon atom to which they are bonded, and one of $R^4$ and $R^6$ may represent a group of the formula

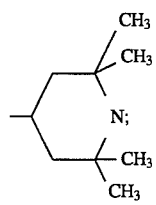

and —M— represents —O— or

in which $R^7$ represents a member selected from a hydrogen atom, alkyl group having 1 to 12 carbon atoms, an aryl group having 6 to 12 carbon atoms and a metal which may be substituted by a lower alkyl group, (ii) heterocyclic compounds represented by the following formula

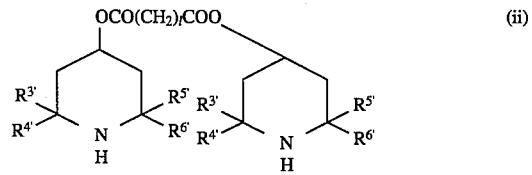

(ii)

wherein each of $R^{3'}$, $R^{4'}$, $R^{5'}$ and $R^{6'}$ represents an alkyl group having 1 to 12 carbon atoms, and is a positive integer of 2 to 10, and (iii) ketones of the following formula

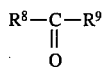

wherein each of $R^8$ and $R^9$ represents a group selected from alkyl groups having 3 to 20 carbon atoms and aryl groups having 6 to 20 carbon atoms and at least one of $R^8$ and $R^9$ represents a tertiary alkyl group or an ortho-alkyl substituted aryl group.

Many proposals have already been made as to a method for producing solid catalyst components containing magnesium, titanium, a halogen and an electron donor as essential ingredients. It is also known that when utilized for the polymerization of α-olefins having at least 3 carbon atoms, the above solid catalyst components can give highly stereospecific polymers with high catalytic activity. Many of them, however, are still desired to be improved in regard to their activity or the stereospecificity of the resultant polymers.

For example, in order to obtain olefin polymers of high quality without performing after-treatment of the polymers after the polymerization, the ratio of the stereospecific polymer formed should be very high and the yield of the polymer per unit weight of the transition metal should be sufficiently high. Some of the previously proposed techniques may be said to be on a fairly high level from the aforesaid viewpoint when applied to the production of certain polymers. But in view of the residual halogen content of the polymer which has to do with the rusting of molding machines, few can be said to exhibit sufficient performance. In addition, many of them have the defect that in the production of polymers having a high melt index, the yielded amount and stereospecificity of the polymers will be reduced.

For example, Japanese Laid-Open Patent Publication No. 127408/1980 (European Laid-Open Patent Publication No. 16582) discloses the polymerization of olefins in the presence of a catalyst composed of an organometallic compound, a supported titanium compound and as a third component at least one hindered Lewis base. Specifically, this patent document discloses a catalyst composed of an alkyl metal compound of the formula $R_3'''M$ which may include organoaluminum compounds, a titanium metal compound which may include a titanium catalyst component containing magnesium, titanium, halogen and an electron donor, and as a third component, a hindered Lewis base. This patent document generically exemplifies tertiary amines, esters, phosphine, phosphine oxide, phosphoric acid esters, phosphorous acid esters, hexaalkylphosphoric triamides, dimethyl sulfoxide, dimethylformamide, secondary amines, ethers, epoxides, ketones, etc. as the electron donor which the titanium metal compound can contain. As the hindered Lewis base, it generically exemplifies hindered Lewis base derived from piperidine, pyrrolidine, ketones, tetrahydrofuran, secondary and tertiary aromatic amines and tertiary aliphatic amines.

This patent document, however, does not specifically describe as a parameter the combination of the electron donor in the titanium catalyst component selected from (a) through (f) described above and as the third component, the heterocyclic compound or ketone selected from (i), (ii) and (iii). When the catalyst systems specifically disclosed in this Publication are comprehensively considered from the viewpoint of catalytic activity and stereospecificity, it is still difficult to conclude that they give entirely satisfactory results. In particular, they do not give sufficient stereospecificity indices within a molecular weight range which can be utilized industrially.

The present inventors undertook investigations in order to provide a further improved process for the production of an olefin polymer or copolymer. These investigations have led to the discovery that a catalyst composed of (A), (B) and (C) components described above which requires a combination of a specified ester selected from (a) through (f) as an electron donor in the titanium catalyst component and a specified heterocyclic compound or ketone selected from (i), (ii) and (iii) as a third catalyst component has a further improved excellent catalytic performance, and that with this catalyst system, there can be provided a process for the polymerization of olefins in which the activity of the catalyst has excellent durability and the catalyst has a better polymerization activity per unit weight of catalyst and a better ability to produce stereospecific polymers.

It is an object of this invention therefore to provide an improved process for producing an olefin polymer or copolymer.

The above and other objects and advantages of this invention will become more apparent from the following description.

In the process of this invention, the titanium catalyst component (A) essential as an ingredient of the catalyst contains magnesium, titanium, halogen and an electron donor as essential ingredients. The electron donor is an ester selected from the group consisting of (a) through (f) below.

(a) Mono- and polyesters of saturated polycarboxylic acids in which at least one of the esteric carbonyl groups is linked to a tertiary or quaternary carbon atom or to a linear or branched chain with at least 4 carbon atoms;

(b) Mono- and polyesters of unsaturated polycarboxylic acids in which at least two carboxyl groups are linked to vicinal, double bond forming carbon atoms and in which at least one of the hydrocarbyl radicals R of the COOR groups is a saturated or unsaturated branched radical with 3 to 20 carbon atoms, or is an aryl or arylalkyl radical with 6 to 20 carbon atoms;

(c) Mono- and diesters of aromatic dicarboxylic acids with the COOH groups in the ortho-position, in which at least one of the hydrocarbyl radicals R contains from 2 to 20 carbon atoms;

(d) Mono- and polyesters of aromatic hydroxy compounds containing at least two hydroxyl groups in the ortho-position, or esters of hydroxyacids containing at least one hydroxyl group in the ortho-position with respect to the carboxyl group;

(e) Esters of saturated or unsaturated carboxylic acids RCOOR', in which at least one of the hydrocarbyl radicals R and R' is a saturated or unsaturated branched radical with 3 to 20 carbon atoms, or is an arylalkyl radical with 7 to 20 carbon atoms, or is an acyl radical with 3 to 20 carbon atoms linked to the esteric carbonyl group directly or through a methylene group, and in which the R' radical, when linear, is a hydrocarbyl radical containing from 1 to 20 carbon atoms; and (f) Esters of carbonic acid of the formula:

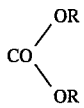

wherein at least one of the hydrocarbyl radicals R, which can be same or different, is a radical having 3 to 20 carbon atoms.

This titanium catalyst component (A) contains a magnesium halide having lower crystallinity than commercial magnesium halides, has a specific surface area of usually at least about 3 m²/g, preferably about 40 to about 1000 m²/g, more specifically about 80 to about 800 m²/g, and does not substantially change in composition upon washing with hexane at room temperature. Preferably, the highly active titanium catalyst component (A) has the following halogen/titanium atomic ratio, electron donor/titanium mole ratio and magnesium/titanium atomic ratio. The halogen/titanium atomic ratio is preferably from about 5 to about 200, more preferably from about 5 to about 100; the electron donor/titanium mole ratio is preferably from about 0.1 to about 10, more preferably from about 0.2 to 6; and the magnesium/titanium atomic ratio is preferably from about 2 to about 100, more preferably from about 4 to about 50.

The highly active titanium catalyst component (A) used in this invention may further contain an organic or inorganic diluent such as a silicon compound, an aluminum compound or a polyolefin.

The titanium catalyst component (A) is obtained by contacting a magnesium compound or metallic magnesium, a titanium compound and the electron donor. If desired, other reagents such as compounds of silicon or aluminum may be used together.

Methods for producing such a titanium catalyst component (A) are known per se. It can be produced, for example, in accordance with the methods disclosed in Japanese Laid-Open Patent Publications Nos. 108385/1975 and 20297/1976 (these are corresponding to German Laid-Open Patent Publication No. 2,504,036), 126590/1975 (corresponding to U.S. Pat. No. 4,069,169), 28189/1976 (corresponding to U.S. Pat. No. 4,076,924), 64586/1976, 92885/1976 (corresponding to U.S. Pat. 4,085,276), 136625/1976, 87489/1977 (corresponding to U.S. Pat. No. 4,250,285), 100596/1977, 147688/1977 (corresponding to U.S. Pat. No. 4,232,139), 104593/1977 (corresponding to U.S. Pat. No. 4,143,223), 2580/1978 (corresponding to British Pat. No. 1,554,340), 40093/1978 (corresponding to British Pat. No. 1,554,248), 43094/1978, 135102/1980 and 135103/1981 (these two correspond to U.S. Pat. No. 4,330,649), 11908/1981 (corresponding to European Laid-Open Pat. Publication No. 22,675) and 18606/1981 (corresponding to European Laid-Open Pat. Publication No. 23,425).

Several examples of these methods for producing the titanium catalyst component (A) are briefly described below.

(1) A magnesium compound or a complex of a magnesium compound with an electron donor selected from the group consisting of (a) through (f) is pulverized or not pulverized in the presence or absence of an electron donor, a pulverization aid, etc., and pre-treated or not pre-treated with an electron donor and/or an organoaluminum compound or a reaction aid such as a halogen-containing silicon compound. The resulting solid is reacted with a titanium compound which is liquid under the reaction conditions. The above electron donor should be used at least once.

(2) A liquid form of a magnesium compound having no reducing ability is reacted with a liquid titanium compound in the presence of an electron donor selected from the group consisting of (a) through (f) to precipitate a solid titanium composition.

(3) The product obtained in (2) is reacted further with a titanium compound.

(4) The product obtained in (1) or (2) is reacted further with an electron donor selected from (a) through (f) and a titanium compound.

(5) A magnesium compound or a complex of a magnesium compound with an electron donor is pulverized in the presence or absence of an electron donor, a pulverization aid, etc. and in the presence of a titanium compound, and then pre-treated or not pre-treated with an electron donor selected from (a) through (f) and/or an organoaluminum compound or a reaction aid such as a halogen-containing silicon compound. The resulting solid is treated with a halogen, a halogen compound or an aromatic hydrocarbon. The electron donor should be used at least once.

(6) The aforesaid compound is treated further with a halogen or a halogen compound.

Among these catalyst components, those obtained by using a liquid titanium halide in the catalyst preparation, or those obtained by using a halogenated hydrocarbon during or after the action of the titanium compound are especially preferred.

Examples of preferred esters (a) used as a component of the highly active titanium catalyst component (A) in this invention include $C_2$-$C_{20}$ alkyl or aryl esters of succinic, malonic or glutaric acid in which the α-position is substituted by a $C_1$-$C_{20}$ alkyl or aryl group, such as diethyl methylsuccinate, diisobutyl α-methylglutarate, diethyl methylmalonate, diethyl ethylmalonate, diethyl phenylmalonate, diethyl diethylmalonate, diethyl diisobutylmalonate, and diethyl n-butylmalonate; $C_1$-$C_{20}$ alkyl or aryl esters of $C_6$-$C_{20}$ long-chain dicarboxylic acids, such as diethyl adipate, diisobutyl adipate, diisopropyl sebacate, di-n-butyl sebacate, di-n-octyl sebacate and di-2-ethyl hexyl sebacate; and $C_7$-$C_{20}$ alicyclic polycarboxylic acid esters such as diethyl 1,2-cyclohexanecarboxylate and diisobutyl 1,2-cyclohexanecarboxylate.

Examples of preferred esters (b) are diisobutyl maleate, diisobutyl butylmaleate, di-2-ethylhexyl fumarate and diisobutyl 3,4-furanecarboxylate.

Examples of preferred esters (c) include $C_9$-$C_{30}$ aromatic dicarboxylic acid esters such as monoethyl phthalate, dimethyl phthalate, methylethyl phthalate, monoisobutyl phthalate, mono-n-butyl phthalate, diethyl phthalate, ethylisobutyl phthalate, ethyl-n-butyl phthalate, di-n-propyl phthalate, diisopropyl phthalate, di-n-butyl phthalate, diisobutyl phthalate, di-n-heptyl phthalate, di-2-ethylhexyl phthalate, di-n-octyl phthalate, dineopentyl phthalate, didecyl phthalate, benzylbutyl phthalate, diphenyl phthalate, diethyl naphthalenedicarboxylate and dibutyl naphthalenedicarboxylate.

Examples of preferred esters (d) are esters of $C_8$-$C_{30}$ esters of salicyclic acid or its derivatives, such as benzoyl ethylsalicylate, acetyl isobutylsalicylate and acetyl methylsalicylate, acetoxybenzenes such as 1,2-diacetoxybenzene and acetoxynaphthalenes such as 2,3-diacetoxynaphthalene.

Examples of preferred esters (e) include $C_5$-$C_{20}$ monoesters of carboxylic acids such as dimethylacetic acid, trimethylacetic acid, α-methylbutyric acid, β-methylbutyric acid, methacrylic acid and benzoylacetic acid.

Examples of preferred-esters (f) include diisopropyl carbonate, diisobutyl carbonate and diphenyl carbonate.

In supporting these electron donors, they need not always to be used as starting materials, and it is possible to use compounds convertible to these esters in the course of preparing the titanium catalyst component, and to convert them into the esters in the preparation step.

The magnesium compound used in preparing the solid titanium catalyst component (A) in this invention is a magnesium compound with or without a reducing ability. Examples of the former are magnesium compounds having a magnesium-carbon bond or a magnesium-hydrogen bond, such as dimethyl magnesium, diethyl magnesium, dipropyl magnesium, dibutyl magnesium, diamyl magnesium, dihexyl magnesium, didecyl magnesium, ethyl magnesium chloride, propyl magnesium chloride, butyl magnesium chloride, hexyl magnesium chloride, amyl magnesium chloride, butyl ethoxy magnesium, ethyl butyl magnesium and butyl magnesium hydride. These magnesium compounds may be used in the form of complexes with organoaluminum, etc., and may be liquid or solid.

On the other hand, examples of the magnesium compound having no reducing ability include magnesium halides such as magnesium chloride, magnesium bromide, magnesium iodide and magnesium fluoride; alkoxy magnesium halides such as methoxy magnesium chloride, ethoxy magnesium chloride, isopropoxy magnesium chloride, butoxy magnesium chloride and octoxy magnesium chloride; aryloxy magnesium halides such as phenoxy magnesium chloride and methylphenoxy magnesium chloride; alkoxy magnesiums such as ethoxy magnesium, isopropoxy magnesium, butoxy magnesium, n-octoxy magnesium and 2-ethylhexoxy magnesium; aryloxy magnesiums such as phenoxy magnesium and dimethylphenoxy magnesium; and magnesium carboxylates such as magnesium laurate and magnesium stearate. These magnesium compounds having no reducing ability may be those derived from the aforesaid magnesium compounds having a reducing ability, or derived during the preparation of the catalyst component. For example, magnesium compounds having no reducing ability may be obtained by contacting magnesium compounds having a reducing ability with such compounds as polysiloxane compounds, halogen-containing silane compounds, halogen-containing aluminum compounds, esters and alcohols. The above magnesium compounds may be complexes or compositions with other metals or mixtures with other metal compounds. Or they may be mixtures of two or more of these compounds. Among them, the magnesium compounds having no reducing ability are preferred. Especially preferred are the halogen-containing magnesium compounds, above all magnesium chloride, alkoxy magnesium chlorides and aryloxy magnesium chlorides.

There are various titanium compounds used in the preparation of the solid titanium catalyst component (A) in this invention. For example, tetravalent titanium compounds of the formula $Ti(OR)_g X_{4-g}$ (R is a hydrocarbon group, such as an alkyl group having 1 to 8 carbon atoms, X is a halogen, and $0 \leq g \leq 4$) are suitable. Specific examples may include titanium tetrahalides such as $TiCl_4$, $TiBr_4$ and $TiI_4$; alkoxy titanium trihalides such as $Ti(OCH_3)Cl_3$, $Ti(OC_2H_5)Cl_3$, $Ti(O\ n-C_4H_9)Cl_3$, $Ti(OC_2H_5)Br_3$ and $Ti(O\ iso-C_4H_9)Br_3$; alkoxy titanium dihalides such as $Ti(OCH_3)_2Cl_2$, $Ti(OC_2H_5)_2Cl_2$, $Ti(O\ n-C_4H_9)_2Cl_2$ and $Ti(OC_2H_5)_2Br_2$; trialkoxy titanium monohalides such as $Ti(OCH_3)_3Cl$, $Ti(OC_2H_5)_3Cl$, $Ti(O\ n-C_4H_9)_3Cl$ and $Ti(OC_2H_5)_3Br$; and tetraalkoxy titaniums such as $Ti(OCH_3)_4$, $ti(OC_2H_5)_4$ and $Ti(O\ n-C_4H_9)_4$. Of these, the halogen-containing titanium compounds are preferred. Especially preferred are titanium tetrahalides, above all titanium tetrachloride. These titanium compounds may be used singly or as a mixture. Or they may be used as diluted in hydrocarbons, halogenated hydrocarbons, etc.

The amounts of the titanium compound, the magnesium compound and the electron donor selected from (a) through (f), and other optional compounds such as silicon compounds and aluminum compounds may be properly selected. In the preparation of the titanium catalyst component (A), the amounts of the magnesium compound, the titanium compound and the electron donor (a) through (f) are, for example, such that about 0.05 to about 5 moles of the electron donor and about 0.05 to about 500 moles, of the titanium compound are used per mole of the magnesium compound.

In the present invention, olefins are polymerized or copolymerized by using a combination catalyst composed of the aforesaid titanium catalyst component (A), the organoaluminum compound (B), and the third component (C) described hereinafter.

As examples of the component (B), the following can be cited.

(i) Organoaluminum compounds having at least one Al-carbon bond in the molecule, for example organoaluminum compounds expressed by the following formula $$R^1_m Al(OR^2)_n H_p X_q$$

wherein $R^1$ and $R^2$ are hydrocarbon groups, such as those containing 1 to 15 carbon atoms, preferably 1 to 4 carbon atoms, and may be identical or different, X is a halogen atom, m is a number represented by $0 \leq m \leq 3$, n is a number represented by $0 \leq n \leq 3$, p is a number represented by $0 \leq p \leq 3$ and q is a number represented by $0 \leq q \leq 3$ provided that m+n+p+q=3.

Examples of the hydrocarbon group are alkyl groups having 1 to 10 carbon atoms and aryl groups having 6 to 15 carbon atoms.

(ii) Complex alkylated products of metals of Group Ia and aluminum represented by the following general formula $$M^1 Al R^1_4$$

wherein $M^1$ is Li, Na or K, and $R^1$ is as defined above.

The following compounds can be exemplified as the organoaluminum compounds belonging to (i) above.
Compounds of the general formula $$R^1_m Al(OR^2)_{3-m}$$

wherein $R^1$ and $R^2$ are as defined above, and m is preferably a number represented by $1.5 \leq m \leq 3$;
compounds of the general formula $$R^1_m Al X_{3-m}$$

wherein R is as defined above, X is a halogen and m is preferably a number represented by $0 < m < 3$;
compounds of the general formula $$R^1_m Al H_{3-m}$$

wherein $R^1$ is as defined above, and m is preferably $2 \leq m < 3$; and $$R^1_m Al(OR^2)_n X_q$$

wherein $R^1$ and $R^2$ are as defined above, X is a halogen, and $0 < m \leq 3$, $0 \leq n < 3$, $0 \leq q < 3$, and m+n+q=3.

Specific examples of the aluminum compounds belonging to (i) above include trialkyl aluminums such as triethyl aluminum and tributyl aluminum; trialkenyl aluminums such as triisoprenyl aluminum; partially alkoxylated alkyl aluminums, for example dialkyl aluminum alkoxides such as diethyl aluminum ethoxide and dibutyl aluminum butoxide, alkyl aluminum sesquialkoxides such as ethyl aluminum sesquiethoxide and butyl aluminum sesquibutoxide, and compounds having an average composition of the formula $R^1_{2.5}Al(OR^2)_{0.5}$; partially halogenated alkyl aluminums, for example dialkyl aluminum halides such as diethyl aluminum chloride, dibutyl aluminum chloride and diethyl aluminum bromide, alkyl aluminum sesquihalides such as ethyl aluminum sesquichloride, butyl aluminum sesquichloride and ethyl aluminum sesquibromide, and alkyl aluminum dihalides such as ethyl aluminum dichloride, propyl aluminum dichloride and butyl aluminum dibromide; partially hydrogenated alkyl aluminums, for example, dialkyl aluminum hydrides such as diethyl aluminum hydride and dibutyl aluminum hydride and alkyl aluminum dihydrides such as ethyl aluminum dihydride and propyl aluminum dihydride; and partially alkoxylated and halogenated alkyl aluminums such as ethyl aluminum ethoxy chloride, butyl aluminum butoxy chloride, and ethyl aluminum ethoxy bromide.

$LiAl(C_2H_5)_4$ and $LiAl(C_7H_{15})_4$ may be cited as examples of the compounds belonging to (ii) above.

There may also be used organoaluminum compounds in which at least two aluminums are bonded through an oxygen or nitrogen atom, as compounds similar to (i). Examples of such compounds are $(C_2H_5)_2AlOAl(C_2H_5)_2$, $(C_4H_9)_2AlOCl(C_4H_9)_2$, and

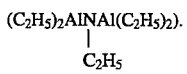

Among these, trialkyl aluminums and the alkyl aluminums in which two or more aluminums are bonded are preferred.

The third component (C) used as a catalyst in the process of this invention is at least one member selected from the group consisting of (i), (ii) and (iii) below.

(i) Heterocyclic compounds represented by the following formula

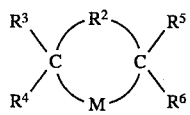

wherein $R^2$ represents an alkylene group having 2 or 3 carbon atoms or a $C_2$-$C_3$ alkylene group substituted by a substituent selected from alkyl, acyloxy and alkoxy groups; each of $R^3$, $R^4$, $R^5$ and $R^6$ represents a hydrogen atom or an alkyl group having 1 to 12, preferably 1 to 8, more preferably 1 to 4 carbon atoms, at least one of $R^3$ and $R^4$ and at least one of $R^5$ and $R^6$ are said alkyl groups, $R^3$ and $R^4$ together, or $R^5$ and $R^6$ together, may form a cycloalkyl group having 5 or 6 carbon atoms when taken together with the carbon atom to which they are bonded, and one of $R^4$ and $R^6$ may represent a group of the formula

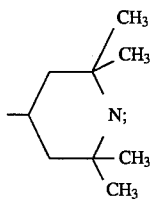

and —M— represents —O— or

in which $R^7$ represents a member selected from a hydrogen atom, alkyl group having 1 to 12, preferably 1 to 8 carbon atoms, an aryl group having 6 to 12 carbon atoms and a metal which may be substituted by a lower alkyl group.

(ii) heterocyclic compounds represented by the following formula

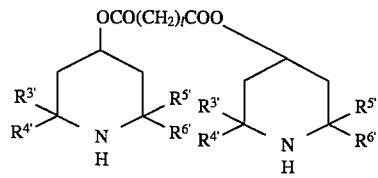

wherein each of $R^{3'}$, $R^{4'}$, $R^{5'}$ and $R^{6'}$ represents an alkyl group having 1 to 12, preferably 1 to 8, more prefereably 1 to 4 carbon atoms, and l is a positive integer of 2 to 10, (iii) ketones of the following formula

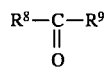

wherein each of $R^8$ and $R^9$ represents a group selected from alkyl groups having 3 to 20, preferably 3 to 12 carbon atoms and aryl groups having 6 to 20, preferably 6 to 12, carbon atoms and at least one of $R^8$ and $R^9$ represents a tertiary alkyl group or an ortho-alkyl substituted aryl group.

In formula (i), examples of substituents for $R^2$ are $C_1$-$C_8$ alkyl groups, $C_2$-$C_{20}$, preferably $C_2$-$C_{12}$, acyloxy groups and $C_1$-$C_8$ alkoxy groups. The metal for $R^7$ may, for example, be an alkali metal or aluminum.

Preferred compounds of formula (i) are those in which all of $R^3$, $R^4$, $R^5$ and $R^6$ are selected from the aforesaid members other than hydrogen. When one of $R^3$ and $R^4$, and/or one of $R^5$ and $R^6$, is hydrogen, those compounds of formula (i) in which the other member in each combination is a secondary or tertiary alkyl group are preferred.

Examples of the compounds of formula (i) are compounds of the following formula

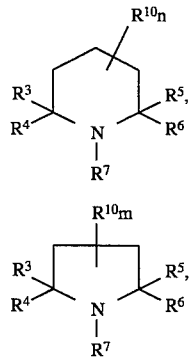

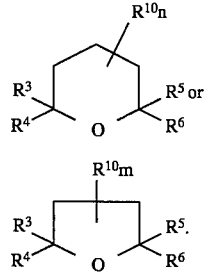

In the formulae, $R^3$, $R^4$, $R^5$, $R^6$ and $R^7$ are as defined above; $R^{10}$ represents a substituent which the group $R^2$ may have, i.e. a group selected from the class consisting of lower alkyl groups for example alkyl groups having 1 to 4 carbon atoms, lower acyloxy groups, for example acyloxy groups having 2 to 8 carbon atoms, and lower alkoxy groups, for example alkoxy groups having 1 to 4 carbon atoms; and n and m are numbers represented by $0 \leq n \leq 3$ and $0 \leq m \leq 2$ and n or m $R^{10}$ groups may be identical or different.
Specific examples of the heterocyclic compounds (i) and the heterocyclic compounds (ii) include the following.
2,6-Substituted piperidines such as
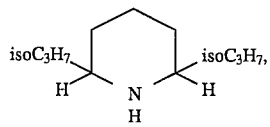
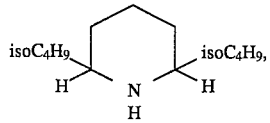
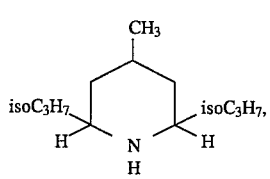
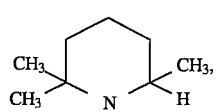
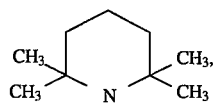
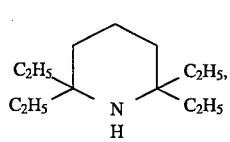
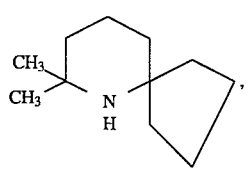
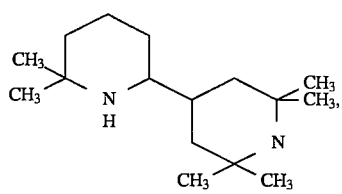
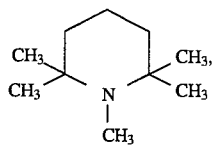
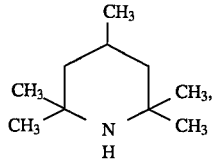
-continued
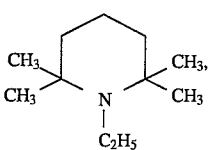
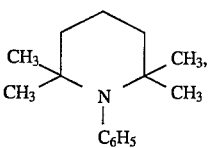
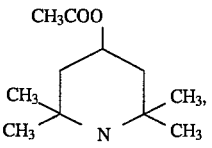
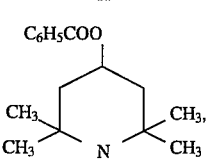
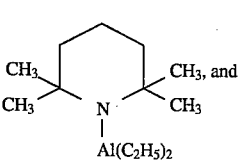
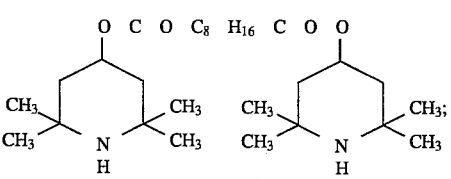
2,5-substituted pyrrolidines such as
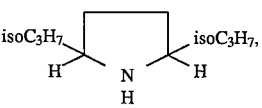
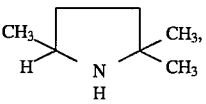
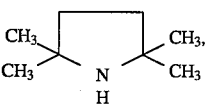
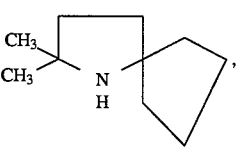
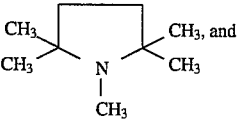

-continued

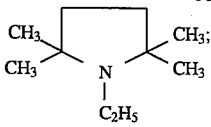

2,6-substituted tetrahydropyrans such as

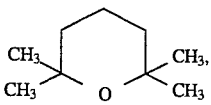

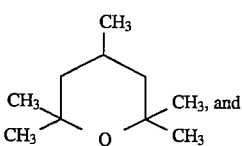

and 2,5-substituted tetrahydrofurans such as

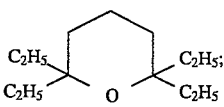

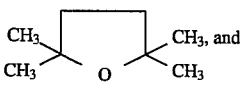

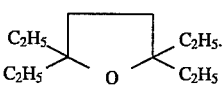

Examples of the ketone (iii) used as component (C) are di-tert-butyl ketone, ortho-tolyl-1-tert-butyl ketone, methyl-2,6-di-tert-butylphenyl ketone and di-ortho-tolyl ketone.

Compounds having such skeletons as 2,2,6,6-tetramethylpiperidine, 2,6-diisopropylpiperidine, 2,2,5,5-tetramethylpyrrolidone, 2,6-diisopropylpyrrolidine and 2,2,5,5-tetramethyl dihydrofuran are preferred as the third component (C) and 2,2,6,6-tetramethylpiperidines are especially preferred.

In the process of this invention, olefins are polymerized or copolymerized, or an olefin is copolymerized with up to 5 mole % of a diolefin, in the presence of the catalyst composed of (A), (B) and (C). In a preferred mode of the process, olefins having 2 to 10 carbon atoms such as ethylene, propylene, 1-butene, 4-methyl-1-pentene and 1-octene are polymerized or copolymerized, or at least one of these olefins is copolymerized with at least one diolefin, for example a conjugated diene such as butadiene, 1,3-pentadiene and isoprene, or a non-conjugated diene such as 1,4-pentadiene, 1,5-hexadiene, 1,4-hexadiene, 1,7-octadiene, vinyl norbornene, ethylidene norbornene and dicyclopentadiene. The polymerization or copolymerization of olefins having 3 to 6 carbon atoms, and the copolymerization of at least one of these olefins with ethylene and/or a diolefin, for example up to 10 mole % of ethylene and/or a diolefin are especially preferred.

The copolymerization may be carried out in any of random and block copolymerization modes. The polymerization or copolymerization may be carried out in the liquid or vapor phase.

In the case of the liquid-phase polymerization, an inert solvent such as hexane, heptane or kerosene may be used as a reaction medium, but the olefin itself may be used as the reaction medium.

In the practice of the process of this invention, the amount of the catalyst used may be properly selected. Preferably, per liter of the volume of the reaction system (the liquid-phase reaction system in the case of the liquid-phase reaction, and the vapor-phase reaction system in the case of the vapor-phase reaction), the proportion of the component (A) is about 0.0001 to about 1.0 millimole calculated as the titanium atom, the proportion of the aluminum atom in the component (B) is about 1 to about 2,000, preferably about 5 to about 500 moles, per mole of the titanium atom in component (A), and the proportion of the component (C), calculated as the hetero atom, is about 0.001 to 100 moles, preferably about 0.001 to about 10 moles, more preferably about 0.01 to about 2 moles, especially preferably about 0.05 to about 1 mole, per mole of the aluminum atom in the component (B).

The catalyst components (A), (B) and (C) may be contacted with each other during or before the polymerization. In the case of contacting before the polymerization, the three components may be contacted simultaneously. Or any two of them may be selected and contacted with each other and then further contacted with the remaining one. Or two or three of them may be partly taken out individually and contacted with each other, and then further contacted with the remaining one component and/or the remainder. The contacting of the components before the polymerization may be carried out in an atmosphere of an inert gas or an olefin.

The temperature at which the olefin is polymerized is, for example, about 20° to about 200° C., preferably about 50° to about 180° C. and the pressure for olefin polymerization is, for example, from atmospheric pressure to about 100 kg/cm², preferably about 2 to about 50 kg/cm². The polymerization can be carried out in any of batchwise, semi-continuous and continuous modes. It is also possible to carry out the polymerization in two or more stages having different reaction conditions.

In particular, when the invention is applied to the stereospecific polymerization or copolymerization of α-olefins having at least 3 carbon atoms, polymers or copolymers having a high stereospecificity index can be produced with a high catalytic efficiency. In the polymerization of olefins with solid catalyst components previously suggested, an attempt to obtain a polymer having a high melt index by using hydrogen tends to result in a fairly great reduction in stereospecificity. The use of this invention can reduce this tendency. Furthermore, since the solid catalyst component is highly active and the amount of the polymer yielded per unit weight of the solid catalyst component is larger than that obtained with the use of a previously proposed solid catalyst component when polymers having the same stereospecificity index are to be obtained, the catalyst residue, especially the amount of halogen, in the polymer can be reduced. This not only makes it possible to omit the catalyst removing operation but also to markedly inhibit the rusting tendency of a mold in a molding process.

Furthermore, the melt index of the polymer can be changed by using a smaller amount of a molecular weight controlling agent such as hydrogen than in the case of using conventional catalyst systems. Surprisingly, the catalyst of the invention has the characteristic that by increasing the amount of the molecular weight controlling agent such as hydrogen to be added, the activity of the catalyst rather increases. This is not seen in the conventional catalyst systems. In obtaining polymers having a high melt index with the conventional catalyst systems, increasing of the amount of the molecular weight controlling agent such as hydrogen results in a reduction in the partial pressure of olefin monomer, and consequently the activity of the catalyst system necessarily decreases. In contrast, the catalyst system in accordance with this invention does not at all present such problems, but rather its activity will increase.

With the conventional catalyst systems, a reduction in activity occurs with the lapse of the polymerization time, but this is scarcely observed in the catalyst system of the invention. This leads to a great increase in the amount of polymers produced by using the catalyst system, for example, in multi-step continuous polymerization.

The following examples illustrate the invention in greater detail.

EXAMPLE 1

[Preparation of Solid Catalyst Component (A)]

The inside of a high speed stirred device (made by Tokushu Kika Kogyo K. K.) having an inside capacity of 2 liters was fully purged with $N_2$, and then 700 ml of purified kerosene, 10 g of commercial $MgCl_2$, 24.2 g of ethanol and 3 g of Emasol 320 (a trademark for sorbitan distearate manufactured by Kao-Atlas Co., Ltd.) were charged into the device. The temperature of the system was raised with stirring, and these materials were stirred at 120° C. and 800 rpm for 30 minutes. With stirring at high speed, the mixture was transferred through a Teflon® tube having an inside diameter of 5 mm into a 2-liter glass flask (equipped with a stirrer) containing 1 liter of purified kerosene cooled at $-10°$ C. The resultant solid was collected by filtration and washed fully with hexane to obtain a carrier.

The carrier (7.5 g) was suspended in 150 ml of titanium tetrachloride at room temperature, and the temperature was raised to 120° C. with stirring. At 80° C. attained during the temperature elevation, 1.3 ml of diisobutyl phthalate was added. The mixture was heated to 120° C., and stirred at this temperature for 2 hours. The solid portion was collected by filtration, again suspended in 150 ml of titanium tetrachloride, and again stirred at 130° C. for 2 hours. The solid reaction product was collected by filtration from the resulting reaction mixture and washed with a sufficient amount of purified hexane to give a solid catalyst component (A). This component contained, as atoms, 2.3% by weight of titanium, 64.0% by weight of chlorine and 21.0% by weight of magnesium.

[Polymerization]

A 2-liter autoclave was charged with 750 ml of purified hexane, and in an atmosphere of propylene at room temperature, 2.51 mmoles of triethyl aluminum, 0.126 mmole of 2,2,6,6-tetramethylpiperidine and 0.015 mmole, calculated as the titanium atom, of the catalyst component (A) were introduced into the autoclave. After introducing 200 ml of hydrogen, the temperature was raised to 70° C., and propylene was polymerized for 2 hours. During the polymerization, the pressure was maintained at 7 $kg/cm^2$.G.

After the polymerization, the resulting slurry containing the polymer formed was filtered to separate it into a white powdery polymer and a liquid portion. After drying, the amount of the white powdery polymer yielded was 539.7 g. The polymer had a boiling n-heptane extraction residue of 97.7%, an MI of 1.0, and an apparent density of 0.46 g/ml. On the other hand, concentrating the liquid portion gave 3.6 g of a solvent-soluble polymer. Hence, the activity was 36,200 g-PP/mmole-Ti, and the total II was 96.9%.

EXAMPLE 2

[Preparation of catalyst component (A)]

Anhydrous magnesium chloride (20 g), 8.0 ml of diisobutyl phthalate, 3.3 ml of titanium tetrachloride and 3.0 ml of a silicone oil (TSS-451, 20 cs; a product of Shin-etsu Chemical Co., Ltd.) as a pulverization aid were charged into a stainless steel (SUS-32) ball mill having a capacity of 800 ml and an inside diameter of 100 mm containing 2.8 kg of stainless steel (SUS-32) balls each having a diameter of 15 mm in an atmosphere of nitrogen, and contacted for 24 hours at an impact acceleration of 7 G. Fifteen grams of the resultant co-pulverization product was suspended in 150 ml of 1,2-dichloroethane and contracted with stirring at 80° C. for 2 hours. The solid portion was collected by filtration, and washed sufficiently with purified hexane until no free 1,2-dichloroethane was detected from the washing. The washed product was then dried to give a catalyst component (A). This component contained, as atoms, 3.2% by weight of titanium, 60.0% by weight of chlorine and 17.0% by weight of magnesium, and had a specific surface area of 233 $m^2/g$.

[Polymerization]

A 2-liter autoclave was charged with 750 ml of purified hexane, and in an atmosphere of propylene at room temperature, 2.51 mmoles of triethyl aluminum, 0.250 mmole of 2,2,6,6-tetramethylpyridine and 0.015 mmole, calculated as the titanium atom, of the catalyst component (A) were introduced into the autoclave. After introducing 200 ml of hydrogen into the autoclave, the temperature was raised to 70° C., and propylene was polymerized for 4 hours. During the polymerization, the pressure was maintained at 7 $kg/cm^2$.G. After the polymerization, the resultant slurry containing the polymer formed was filtered to separate it into a white powdery polymer and a liquid portion. After drying, the amount of the white powdery polymer yielded was 351.0 g. The polymer had a boiling n-heptane extraction residue of 95.0%, an MI of 5.1 and an apparent density of 0.38 g/ml. Concentrating the liquid portion gave 6.7 g of a solvent-soluble polymer. Hence, the activity was 23,800 g-PP/mmole-Ti, and the total II was 93.2%.

EXAMPLE 3

[Preparation of Catalyst Component (A)]

Anhydrous magnesium chloride (20 g), 4.9 ml of diisobutyl phthalate and 3.0 ml of a silicone oil (TSS-451, 20 cs; a product of Shin-etsu Chemical Co., Ltd.) as a pulverization aid were charged into a stainless steel (SUS-32) ball mill having a capacity of 800 ml and an inside diameter of 100 mm containing 2.8 kg of stainless steel (SUS-32) balls each having a diameter of 15 mm in an atmosphere of nitrogen, and contacted for 24 hours at an impact acceleration of 7 G. Fifteen grams of the resultant co-pulverization product was suspended in 150 ml of titanium tetrachloride, and contacted with stirring at 110° C. for 2 hours. The solid portion was collected by filtration, and sufficiently washed with purified hexane until no free titanium tetrachloride was detected from the washing. The washed product was dried to give a catalyst component (A). This component contained, as atoms, 3.8% by weight of titanium, 59.6% by weight of chlorine and 16.0% by weight of magnesium.

[Polymerization]

Propylene was polymerized in the same way as in Example 2. The results are shown in Table 1.

EXAMPLE 4

[Preparation of Solid Catalyst Component (A)]

Anhydrous magnesium chloride (4.76 g; 50 millimoles), 25 ml of decane and 23.4 ml (150 mmoles) of 2-ethylhexyl alcohol were heated at 130° C. for 2 hours to form a uniform solution. Phthalic anhydride (1.11 g; 7.5 mmoles) was added to the solution, and the mixture was further stirred at 130° C. for 1 hour to dissolve phthalic anhydride in the aforesaid uniform solution. The uniform solution so obtained was cooled to room temperature, and added dropwise over the course of 1 hour to 200 ml (1.8 moles of titanium tetrachloride kept at $-20°$ C. After the addition, the temperature of the mixed solution was elevated to 110° C. over the course of 4 hours. When the temperature reached 110° C., 2.68 ml (12.5 mmoles) of diisobutyl phthalate was added. The mixture was maintained at the same temperature for 2 hours with stirring. After the 2-hour reaction, the solid portion was collected by hot filtration. The solid portion was re-suspended in 200 ml of titanium tetrachloride, and again reacted at 110° C. for 2 hours. After the reaction, the solid portion was collected again by hot filtration and washed fully with decane and hexane at 110° C. until no free titanium compound was detected from the washing. The solid titanium catalyst component (A) prepared by the above method was stored as a hexane slurry, but a part of it was dried to examine its composition. The solid titanium catalyst component (A) obtained in this way comprised 3.1% by weight of titanium, 56.0% by weight of chlorine, 17.0% by weight of magnesium and 20.9% by weight of diisobutyl phthalate.
[Polymerization]
Propylene was polymerized by the same method as in Example 2. The results are shown in Table 1.

EXAMPLES 5, 6, 7, 8 and 9

[Preparation of Solid Catalyst Component (A)]
A solid catalyst component (A) was prepared in the same way as described in Example 1 except that 1.3 ml of diisobutyl phthalate described in Example 1 was changed to 1.0 ml of diethyl phthalate, 1.8 ml of di-n-heptyl phthalate, 1.2 ml of monoethyl phthalate, 1.4 ml of diethyl n-butylmalonate, and 1.3 ml of diethyl iso-propylmalonate, respectively.
[Polymerization]
Propylene was polymerized by the same method as described in Example 2. The results are shown in Table 1.

EXAMPLES 10–12

[Preparation of Catalyst Component (A)]
A solid catalyst component (A) was prepared in the same way as in Example 2 except that 8.0 ml of diisobutyl phthalate described in Example 2 was changed to 6.7 ml of isobutyl methacrylate, 6.3 ml of diphenyl carbonate, and 5.5 ml of ethyl pivalate, respectively.
[Polymerization]
Propylene was polymerized in the same way as described in Example 2 except that the amount of 2,2,6,6-tetramethylpiperidine (0.25 mmole) in Example 2 was changed to 0.84 mmole (Examples 10, 11 and 12). The results are shown in Table 1.

COMPARATIVE EXAMPLE 1

[Preparation of Solid Catalyst Component (A)]
A Ti-containing catalyst component was prepared by the method described in Example 14 of U.S. Pat. No. 4,315,874 using a carrier prepared by the method described in Example 1. Specifically, the solid catalyst component (A) was prepared in accordance with the method described in Example 1 of this application except that 1.3 ml of diisobutyl phthalate described in Example 1 of this application was changed to 1.83 ml of ethyl benzoate, and the temperatures at which to perform the contacting reaction with titanium tetrachloride (120° C. and 130° C.) were changed to 100° C. and 110° C., respectively.

[Polymerization]
Propylene was polymerized by the same method as in Example 10. The results are shown in Table 1.

COMPARATIVE EXAMPLE 2

[Preparation of Solid Catalyst Component (A)]
A solid catalyst component (A) was prepared by the method described in Example 2 except that 6.0 ml of ethyl benzoate was used instead of 8.0 ml of the diisobutyl phthalate described in Example 2.
[Polymerization]
Propylene was polymerized by the same method as described in Example 2. The results are shown in Table 1.

EXAMPLE 13

Propylene was polymerized in the same way as in Example 1 except that 0.126 mmole of 2,2,6,6-tetramethylpiperidine was changed to 10.0 mmole of 2,2,5,5-tetramethyldihydrofuran.

EXAMPLES 14–17

Propylene was polymerized in the same way as in Example 1 except that 0.126 mmole of 2,2,6,6-tetramethylpiperidine added at the time of polymerization in Example 1 was changed to 0.837 mmole of 4-benzoyloxy-2,2,6,6-tetramethylpiperidine, 0.837 mmole of bis(2,2,6,6-tetramethyl-4-piperidin) sebacate, 0.502 mmole of N-methyl-2,2,6,6-tetramethylpiperidine, and 0.837 mmole of N-diethylaluminum-2,2,6,6-tetramethylpiperidine, respectively. The results are shown in Table 1.

EXAMPLE 18

[Treatment of Solid Catalyst Component (A)]
A 400 ml. reactor equipped with a stirrer and purged fully with $N_2$ was charged with 200 ml of purified hexane, 120 mmoles of triethyl aluminum, 60 mmoles of 2,2,6,6-tetramethylpiperidine and 3 mmoles, calculated as the titanium atom, of the solid catalyst component shown in Example 1, and they were mixed with stirring for 1 hour at room temperature. The resultant hexane slurry containing the solid catalyst component (A) was filtered to remove the liquid phase. Furthermore, 300 ml of hexane was added to suspended the solid substance fully in hexane. The suspension was again filtered to remove the liquid phase. Thus, a treated product of the solid catalyst component (A) was obtained.
[Polymerization of Propylene]
A 2-filter autoclave was charged with 750 ml of purified hexane, and in atmosphere of propylene at room temperature, 0.75 mmole of triethyl aluminum and 0.015 mmole, calculated as the titanium atom, of the treated product of the catalyst component (A) were introduced into the autoclave. After introducing 200 ml of hydrogen, the temperature was elevated to 70° C., and propylene was polymerized for 2 hours. During the polymerization, the pressure was maintained at 7 kg/cm$^2$.G. The results are shown in Table 1.

TABLE 1

| | Solid catalyst component | | | | Polymerization conditions | |
| --- | --- | --- | --- | --- | --- | --- |
| | | Composition of the catalyst (wt. %) | | | | Mol ratio of Al to the N-containing |
| Example | Ester | Ti | Cl | Mg | N-containing compound (C) | compound |
| 1 | Diisobutyl phthalate | 2.3 | 64 | 21 | 2,2,6,6-tetramethyl-piperidine | 20 |
| 2 | Diisobutyl phthalate | 3.2 | 60 | 17 | 2,2,6,6-tetramethyl- | 10 |

TABLE 1-continued

| | | | | | | |
|---|---|---|---|---|---|---|
| 3 | Diisobutyl phthalate | 3.8 | 59 | 16 | 2,2,6,6-tetramethyl-piperidine | 10 |
| 4 | Diisobutyl phthalate | 2.4 | 63 | 20 | 2,2,6,6-tetramethyl-piperidine | 10 |
| 5 | Diethyl phthalate | 4.0 | 61 | 16 | 2,2,6,6-tetramethyl-piperidine | 10 |
| 6 | Di-n-heptyl phthalate | 2.1 | 65 | 20 | 2,2,6,6-tetramethyl-piperidine | 10 |
| 7 | Monoethyl phthalate | 2.8 | 60 | 19 | 2,2,6,6-tetramethyl-piperidine | 10 |
| 8 | Diethyl n-butylmalonate | 2.6 | 64 | 20 | 2,2,6,6-tetramethyl-piperidine | 10 |
| 9 | Diethyl isopropylmalonate | 3.0 | 61 | 19 | 2,2,6,6-tetramethyl-piperidine | 10 |
| 10 | Isobutyl methacrylate | 2.8 | 58 | 20 | 2,2,6,6-tetramethyl-piperidine | 3 |
| 11 | Diphenyl carbonate | 2.0 | 63 | 19 | 2,2,6,6-tetramethyl-piperidine | 3 |
| 12 | Ethyl pivalate | 2.4 | 63 | 19 | 2,2,6,6-tetramethyl-piperidine | 3 |
| Comp. Ex. 1 | Ethyl benzoate | 4.3 | 59 | 18 | 2,2,6,6-tetramethyl-piperidine | 3 |
| Comp. Ex. 2 | Ethyl benzoate | 2.9 | 65 | 20 | 2,2,6,6-tetramethyl-piperidine | 10 |
| 13 | Diisobutyl phthalate | 2.3 | 64 | 21 | 2,2,5,5-tetramethyl dihydrofuran | 0.25 |
| 14 | Diisobutyl phthalate | 2.3 | 64 | 21 | 4-benzoyloxy-2,2,6,6-tetra-methylpiperidine | 3 |
| 15 | Diisobutyl phthalate | 2.3 | 64 | 21 | bis(2,2,6,6-tetramethyl-4-piperidine) sebacate | 3 |
| 16 | Diisobutyl phthalate | 2.3 | 64 | 21 | N-methyl-2,2,6,6-tetra-methylpiperidine | 3 |
| 17 | Diisobutyl phthalate | 2.3 | 64 | 21 | N-diethylaluminum-2,2,6,6-tetramethylpiperidine | 5 |
| 18 | Diisobutyl phthalate | 2.3 | 64 | 21 | 2,2,6,6-tetramethyl-piperidine (**) | — |

| | Results of polymerization | | | | | |
|---|---|---|---|---|---|---|
| Example | Amount of the polymer yielded (g) | Amount of the hexane-soluble polymer (g) | Boiling heptane extraction residue (%) | Activity (g-PP/mmole-Ti) | II of the entire polymers (%) | MI |
| 1 | 539.7 | 4.0 | 97.7 | 36,200 | 96.9 | 1.0 |
| 2 | 351.0 | 6.7 | 95.0 | 23,800 | 93.2 | 5.1 |
| 3 | 378.3 | 5.6 | 96.9 | 25,600 | 95.5 | 3.4 |
| 4 | 329.3 | 4.9 | 97.3 | 22,300 | 95.9 | 3.6 |
| 5 | 302.3 | 2.3 | 97.6 | 20,200 | 96.9 | 3.8 |
| 6 | 394.6 | 4.9 | 97.5 | 26,600 | 96.3 | 4.7 |
| 7 | 140.3 | 1.2 | 97.4 | 9,400 | 96.6 | 8.8 |
| 8 | 285.5 | 3.9 | 96.5 | 19,300 | 95.2 | 5.4 |
| 9 | 209.4 | 2.3 | 96.0 | 14,100 | 95.0 | 7.3 |
| 10 | 137.0 | 2.9 | 94.9 | 9,300 | 92.9 | 5.6 |
| 11 | 167.3 | 4.7 | 94.2 | 11,500 | 91.6 | 6.3 |
| 12 | 162.6 | 4.9 | 95.0 | 11,200 | 92.2 | 5.1 |
| Comp. Ex. 1 | 365.6 | 61.0 | 81.8 | 28,400 | 70.1 | 7.7 |
| Comp. Ex. 2 | 433.7 | —(*) | —(*) | 28,900 | 59.7 | 11.0 |
| 13 | 260.4 | 7.5 | 92.4 | 17,900 | 89.9 | 5.5 |
| 14 | 166.6 | 4.7 | 94.3 | 11,400 | 91.7 | 16.5 |
| 15 | 174.5 | 4.9 | 94.5 | 12,000 | 91.9 | 18.3 |
| 16 | 197,1 | 5.5 | 94.2 | 13,600 | 91.6 | 7.8 |
| 17 | 167.5 | 4.6 | 95.3 | 11,500 | 92.7 | 11.3 |
| 18 | 475.0 | 5.8 | 95.7 | 32,100 | 94.6 | 1.2 |

(*) All of th polymers were collected and dried.
(**) Not added at the time of polymerizing propylene.

What is claimed is:

1. A process for producing an olefin polymer or copolymer which comprises polymerizing or copolymerizing olefins having from 3 to 6 carbon atoms or copolymerizing an olefin having from 3 to 6 carbon atoms with up to 5 mole % of the diolefin and/or up to 10 mole % of ethylene at a temperature of about 20° to 200° C. and a pressure of from atmospheric pressure to about 100 kg/cm² in the presence of a catalyst comprising a titanium catalyst component containing magnesium, titanium, halogen and an electron donor, an organoaluminum compound catalyst component and a third catalyst component, characterized in that said catalyst is composed of (A) a titanium catalyst component containing magnesium, titanium, halogen and an electron donor as essential ingredients, wherein the titanium catalyst component (A) has a halogen/titanium atomic ratio of from about 5 to about 200, an electron donor/titanium mole ratio of from about 0.1 to about 10, and a magnesium/titanium atomic ratio of from about 2 to about 100, said electron donor being selected from the group consisting of benzoyl ethylsalicylate, acetyl isobutylsalicylate, acetyl methylsalicylate, 1,2-diacetoxybenzene, and 2,3-diacetoxynaphthalene;

(B) an organoaluminum compound, and (C) a third component selected from the group consisting of
(i) heterocyclic compounds represented by the following formula

wherein $R^2$ represents an alkylene group having 2 to 3 carbon atoms or a $C_2$-$C_3$ alkylene group substituted by a substituent selected from alkyl, acyloxy and alkoxy groups; each of $R^3$, $R^4$, $R^5$ and $R^6$ represents a hydrogen atom or an alkyl group having 1 to 12 carbon atoms, at least one of $R^3$ and $R^4$ and at least one of $R^5$ and $R^6$ are said alkyl groups, $R^3$ and $R^4$ together, or $R^5$ and $R^6$ together, may form a cycloalkyl group having 5 or 6 carbon atoms when taken together with the carbon atom to which they are bonded, and one of $R^4$ and $R^6$ may represent a group of the formula

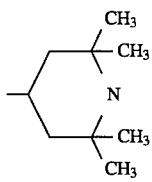

and —M— represents —O— or

in which $R^7$ represents a member selected from a hydrogen atom, alkyl group having 1 to 12 carbon atoms, an aryl group having 6 to 12 carbon atoms and a metal which may be substituted by a lower alkyl group, (ii) heterocyclic compounds represented by the following formula

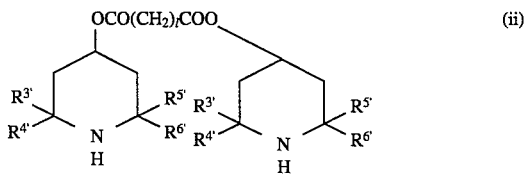

wherein each of $R^{3'}$, $R^{4'}$, $R^{5'}$ and $R^{6'}$ represents an alkyl group having 1 to 12 carbon atoms, and l is a positive integer of 2 to 10, and (iii) ketones of the following formula

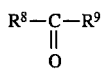

wherein each of $R^8$ and $R^9$ represents a group selected from alkyl groups having 3 to 20 carbon atoms and aryl groups having 6 to 20 carbon atoms and at least one of $R^8$ and $R^9$ represents a tertiary alkyl group or an ortho-alkyl substituted aryl group.

2. A process for producing an olefin polymer or copolymer which comprises polymerizing or copolymerizing olefins having from 3 to 6 carbon atoms or copolymerizing an olefin having from 3 to 6 carbon atoms with up to 5 mole % of the diolefin and/or up to 10 mole % of ethylene at a temperature of about 20° to 200° C. and a pressure of from atmospheric pressure to about 100 kg/cm² in the presence of a catalyst comprising a titanium catalyst component containing magnesium, titanium, halogen and an electron donor, an organoaluminum compound catalyst component and a third catalyst component, characterized in that said catalyst is composed of (A) a titanium catalyst component containing magnesium, titanium, halogen and an electron donor as essential ingredients, wherein the titanium catalyst component (A) has a halogen/titanium atomic ratio of from about 5 to about 200, an electron donor/titanium mole ratio of from about 0.1 to about 10, and a magnesium/titanium atomic ratio of from about 2 to about 100, said electron donor being selected from the group consisting of (a) mono- and polyesters of saturated polycarboxylic acids in which at least one of the esteric carbonyl groups is linked to a tertiary or quaternary carbon atom or to a linear or branched chain with at least 4 carbon atoms;

(b) mono- and polyesters of unsaturated polycarboxylic acids in which at least two carboxyl groups are linked to vicinal, double bond forming carbon atoms and in which at least one of the hydrocarbyl radicals R of the COOR groups is a saturated or unsaturated branched radical with 3 to 20 carbon atoms, or is an aryl or arylalkyl radical with 6 to 20 carbon atoms;

(c) mono- and diesters of aromatic dicarboxylic acids with the COOH groups in the ortho-position, in which at least one of the hydrocarbyl radicals R contains from 2 to 20 carbon atoms;

(d) mono- and polyesters of aromatic hydroxy compounds containing at least two hydroxyl groups in the ortho-position, or esters of hydroxyacids containing at least one hydroxyl group in the ortho-position with respect to the carboxyl group; and (e) esters of saturated or unsaturated carboxylic acids RCOOR', in which at least one of the hydrocarbyl radicals R and R' is a saturated or unsaturated branched radical with 3 to 20 carbon atoms, or is an arylalkyl radical with 7 to 20 carbon atoms, or is an acyl radical with 3 to 20 carbon atoms linked to the esteric carbonyl group directly or through a methylene group, and in which the R' radical, when linear, is a hydrocarbyl radical containing from 1 to 20 carbon atoms;

(B) an organoaluminum compound, and (C) a third component selected from the group consisting of heterocyclic compounds represented by the following formula (ii)

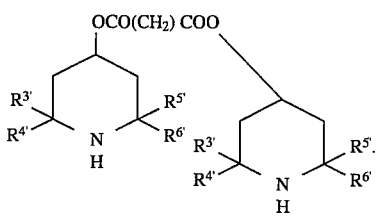  (ii)

wherein each of $R^{3'}$, $R^{4'}$, $R^{5'}$ and $R^{6'}$ represents an alkyl group having 1 to 12 carbon atoms, and $l$ is a positive integer of 2 to 10.

3. The process of claim 2 wherein the heterocyclic compound of formula (ii) is the compound of formula

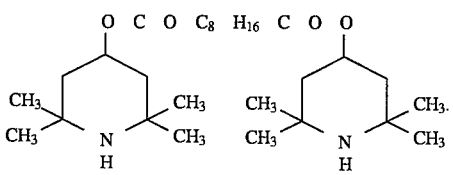

4. A process for producing an olefin polymer or copolymer which comprises polymerizing an olefin or copolymerizing olefins or copolymerizing an olefin with up to 5 mole % of a diolefin in the presence of a catalyst comprising a titanium catalyst component containing magnesium, titanium, halogen and an electron donor, an organoaluminum compound catalyst component and a third catalyst component, characterized in that said catalyst is composed of (A) a titanium catalyst component containing magnesium, titanium, halogen and an electron donor as essential ingredients, wherein the titanium catalyst component (A) has a halogen/titanium atomic ratio of from about 5 to about 200, an electron donor/titanium mole ratio of from about 0.1 to about 10, and a magnesium/titanium atomic ratio of from about 2 to about 100, said electron donor being selected from the group consisting of benzoyl ethylsalicylate, acetyl isobutylsalicylate, acetyl methylsalicylate, 1,2-diacetoxybenzene, and 2,3-diacetoxynaphthalene;

(B) an organoaluminum compound, and (C) a third component selected from the group consisting of
  (i) heterocyclic compounds represented by the following formula

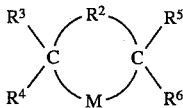  (i)

wherein $R^2$ represents an alkylene group having 2 to 3 carbon atoms or a $C_2$-$C_3$ alkylene group substituted by a substituent selected from alkyl, acyloxy and alkoxy groups; each of $R^3$, $R^4$, $R^5$ and $R^6$ represents a hydrogen atom or an alkyl group having 1 to 12 carbon atoms, at least one of $R^3$ and $R^4$ and at least one of $R^5$ and $R^6$ are said alkyl groups, $R^3$ and $R^4$ together, or $R^5$ and $R^6$ together, may form a cycloalkyl group having 5 or 6 carbon atoms when taken together with the carbon atom to which they are bonded, and one of $R^4$ and $R^6$ may represent a group of the formula

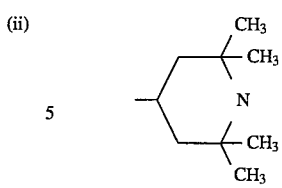

and —M— represents —O— or $$-\underset{R^7}{\overset{|}{N}}-$$

in which $R^7$ represents a member selected from a hydrogen atom, alkyl group having 1 to 12 carbon atoms, an aryl group having 6 to 12 carbon atoms and a metal which may be substituted by a lower alkyl group,
  (ii) heterocyclic compounds represented by the following formula

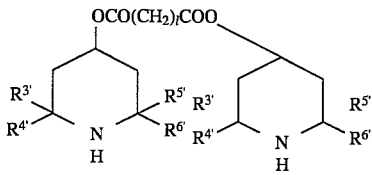  (ii)

wherein each of $R^{3'}$, $R^{4'}$, $R^{5'}$ and $R^{6'}$ represents an alkyl group having 1 to 12 carbon atoms, and $l$ is a positive integer of 2 to 10, and
  (iii) ketones of the following formula

wherein each of $R^8$ and $R^9$ represents a group selected from alkyl groups having 3 to 20 carbon atoms and aryl groups having 6 to 20 carbon atoms and at least one of $R^8$ and $R^9$ represents a tertiary alkyl group or an ortho-alkyl substituted aryl group.

5. A process for producing an olefin polymer or copolymer which comprises polymerizing an olefin or copolymerizing olefins or copolymerizing an olefin with up to 5 mole % of a diolefin in the presence of a catalyst comprising a titanium catalyst component containing magnesium, titanium, halogen and an electron donor, an organoaluminum compound catalyst component and a third catalyst component, characterized in that said catalyst is composed of (A) a titanium catalyst component containing magnesium, titanium, halogen and an electron donor as essential ingredients, wherein the titanium catalyst component (A) has a halogen/titanium atomic ratio of from about 5 to about 200, an electron donor/titanium mole ratio of from about 0.1 to about 10, and a magnesium/titanium atomic ratio of from about 2 to about 100, said electron donor being selected from the group consisting of
  (a) mono- and polyesters of saturated polycarboxylic acids in which at least one of the esteric carbonyl groups is linked to a tertiary or quaternary carbon atom or to a linear or branched chain with at least 4 carbon atoms;
  (b) mono- and polyesters of unsaturated polycarboxylic acids in which at least two carboxyl groups are linked to vicinal, double bond forming carbon atoms and in which at least one of the hydrocarbyl radicals R of the COOR groups is a saturated or unsaturated branched radical with 3 to 20 carbon atoms, or is an aryl or arylalkyl radical with 6 to 20 carbon atoms;

(c) mono- and diesters of aromatic dicarboxylic acids with the COOH groups in the ortho-position, in which at least one of the hydrocarbyl radicals R contains from 2 to 20 carbon atoms;

(d) mono- and polyesters of aromatic hydroxy compounds containing at least two hydroxyl groups in the ortho-position, or esters of hydroxyacids containing at least one hydroxyl group in the ortho-position with respect to the carboxyl group; and (e) esters of saturated or unsaturated carboxylic acids RCOOR', in which at least one of the hydrocarbyl radicals R and R' is a saturated or unsaturated branched radical with 3 to 20 carbon atoms, or is an arylalkyl radical with 7 to 20 carbon atoms, or is an acyl radical with 3 to 20 carbon atoms linked to the esteric carbonyl group directly or through a methylene group, and in which the R' radical, when linear, is a hydrocarbyl radical containing from 1 to 20 carbon atoms;

(B) an organoaluminum compound, and (C) a third component selected from the group consisting of heterocyclic compounds represented by the following formula (ii)

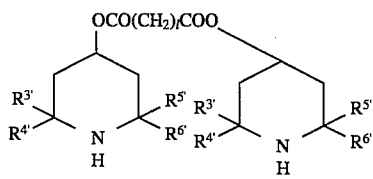

wherein each of $R^{3'}$, $R^{4'}$, $R^{5'}$ and $R^{6'}$ represents an alkyl group having 1 to 12 carbon atoms, and l is a positive integer of 2 to 10.

6. A process for producing an olefin polymer or copolymer which comprises polymerizing or copolymerizing olefins having from 3 to 6 carbon atoms or copolymerizing an olefin having from 3 to 6 carbon atoms with up to 5 mole % of the diolefin and/or up to 10 mole % of ethylene at a temperature of about 20° to 200° C. and a pressure of from atmospheric pressure to about 100 kg/cm² in the presence of a catalyst comprising a titanium catalyst component containing magnesium, titanium, halogen and an electron donor, an organoaluminum compound catalyst component and a third catalyst component, wherein said catalyst includes the following components (A), (B), and (C):

(A) a titanium catalyst component containing magnesium, titanium, halogen and an electron donor as essential ingredients, wherein the titanium catalyst component (A) has a halogen/titanium mole ratio of from about 5 to about 200, an electron donor/titanium mole ratio of from about 0.1 to about 10, and a magnesium/titanium atomic ratio of from about 2 to about 100, said electron donor consisting essentially of diethyl diethyl malonate;

(B) an organoaluminum compound, and (C) a third component selected from the group consisting of (i) heterocyclic compounds represented by the following formula

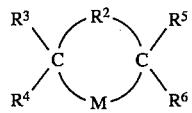

wherein $R^2$ represents an alkylene group having 2 to 3 carbon atoms or a $C_2$-$C_3$ alkylene group substituted by a substituent selected from alkyl, acyloxy and alkoxy groups; each of $R^3$, $R^4$, $R^5$ and $R^6$ represents an alkyl group having 1 to 12 carbon atoms, at least one of $R^3$ and $R^4$ and at least one of $R^5$ and $R^6$ are said alkyl groups, $R^3$ and $R^4$ together, or $R^5$ and $R^6$ together, may form a cycloalkyl group having 5 or 6 carbon atoms when taken together with the carbon atom to which they are bonded, and one of $R^4$ and $R^6$ may represent a group of the formula

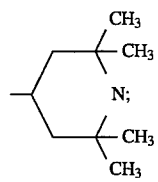

and —M— represents —NH—, and (ii) heterocyclic compounds represented by the following formula

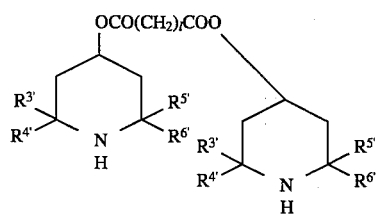

wherein each of $R^{3'}$, $R^{4'}$, $R^{5'}$, and $R^{6'}$ represents an alkyl group having 1 to 12 carbon atoms, and l is a positive integer of 2 to 10; and the proportions of the component (C), calculated as the hetero atom, are about 0.001 to about 10 moles, per mole of the aluminum atom in the component (B).

7. The process of claim 6 wherein the third component (C) consists essentially of 2,2,6,6-tetramethyl piperidine.

* * * * *